United States Patent [19]
Watson et al.

[11] 3,758,622
[45] Sept. 11, 1973

[54] PREPARATION OF ALKYNYL ARYL COMPOUNDS

[75] Inventors: James M. Watson; Birt Allison, both of Big Spring, Tex.

[73] Assignee: Cosden Oil & Chemical Company, Big Spring, Tex.

[22] Filed: May 25, 1971

[21] Appl. No.: 146,797

[52] U.S. Cl... 260/668 R, 204/158 HA, 204/162 R, 260/651 R, 260/668 D
[51] Int. Cl. ............................................. C07c 15/04
[58] Field of Search .................. 260/668 R, 669 R, 260/651 R; 204/158 HA, 162 R

[56] References Cited
UNITED STATES PATENTS

| | | | |
|---|---|---|---|
| 2,926,201 | 2/1960 | Driesbach et al. | 260/651 R |
| 3,338,811 | 8/1967 | Soffer et al. | 204/158 HA |
| 3,542,888 | 11/1970 | d'Ostrowick et al. | 260/668 R |
| 3,594,423 | 7/1971 | Relles | 260/668 R |

Primary Examiner—Curtis R. Davis
Attorney—M. N. Cheairs and Charles D. Tuttle

[57] ABSTRACT

A process for the conversion of alkyl aryl compounds to alkynyl aryl compounds which comprises subjecting said alkyl aryl compounds to chlorination under conditions suitable for the dichlorination of at least one carbon atom of an alkyl substituent to said alkyl aryl compound or monochlorination of adjacent carbon atoms of said alkyl substituent, subjecting the resulting chlorinated alkyl aryl compound to dehydrochlorination in the presence of a basic medium, and thereafter recovering alkynyl aryl compounds.

7 Claims, No Drawings

3,758,622

PREPARATION OF ALKYNYL ARYL COMPOUNDS

BACKGROUND OF THE INVENTION

The present invention relates to the preparation of alkynyl aryl compounds. More particularly, the present invention relates to the process for the preparation of alkynyl aryl compounds from corresponding alkyl aryl compounds.

Certain alkynyl aryl compounds, particularly the dialkynyl aryl compounds such as diethynylbenzene, have been found to be very useful in the preparation of polymer compositions some of which are very resistant to high temperatures. In the past, the preparation of alkynyl aryl compounds primarily has been by halogenation of an alkenyl aryl compound followed by dehydrohalogenation of the resulting halogenated alkenyl aryl compounds. While such method is satisfactory in many respects, there are several disadvantages involved in its practice which make desirable the finding of new and improved methods and routes for the commercial production of alkynyl aryl compounds.

Exemplary of the disadvantages found in the above described known method for preparing alkynyl aryl compounds are those found in the preparation of diethynylbenzenes from divinylbenzenes via the bromination and subsquent dehydrobromination of the divinylbenzenes. In employing the method of preparation, it is quite difficult to obtain the divinylbenzenes in the relatively pure form desired due to the difficulty of preventing polymer formation during distillation of divinylbenzene fractions to effect purification thereof. Additionally, a significant disadvantage of this previous method is found in the handling of the bromine required, bromine and many of its by-products produced in this process being relatively dangerous to handle and highly corrosive to the equipment involved as well as, in some instances, difficult to remove. Further, bromine and certain of the resulting products formed in the process tend to catalyze polymerization of the unsaturated reactants and products during the course of the process. Still further, and most important, due to the complexities of obtaining the unsaturated reactants and of the bromination and dehydrobromination procedure, this prior method is rather expensive to operate and results in the alkynyl aryl products being too costly and results in the alkynyl aryl products being too costly for widespread utilization.

It is now an object of the present invention to provide a new and improved process for the preparation of alkynyl aryl compounds.

Another object of the present invention is to provide a new and improved process for the production of alkynyl aryl compounds in which bromine is not employed.

An additional object of the present invention is to provide a new and improved process for the production of alkynyl aryl hydrocarbons which process is much less expensive to practice.

Still another object of the present invention is to provide a new and improved process for the production of alkynyl aryl hydrocarbons in which such products are produced from alkyl aryl hydrocarbons.

A particular object of the present invention is to provide a new and improved process for the production of diethynylbenzenes from diethylbenzenes.

Another particular object of the present invention is to provide a new and improved process for the manufacture of diethynylbenzenes wherein such compounds are produced from diethylbenzene and in which process neither bromine nor divinylbenzene are employed.

Additional objects will become apparent from the following description of the invention herein disclosed.

SUMMARY OF THE INVENTION

In fulfillment of the above and other objects, the present invention is a process for producing alkynyl aryl compounds which comprises subjecting alkyl aryl compounds to chlorination under conditions suitable for the dichlorination of at least one carbon atom of an alkyl substituent of said alkyl aryl compound or monochlorination of adjacent carbon atoms of said alkyl substituent, subjecting the resulting chlorinated alkyl aryl compound to dehydrochlorination in the presence of a basic medium, and thereafter recovering alkynyl aryl compounds. Generally, chlorination is carried out by contacting chlorine with the alkyl aryl compound under autogenous conditions in the presence of a light source of wavelength sufficient to reduce chlorine to atomic form. By adjacent carbon atoms, as used herein, is meant carbon atoms spaced from one another by no more than one intermediate carbon atom.

By the process of the present invention, alkynyl aryl compounds are produced in good yields much less expensively than by prior processes. Also, the process of the present invention does not require the handling and use of bromine and does not require the use of readily polymerizable feed materials which are relatively difficult and expensive to obtain in required purity.

DESCRIPTION OF THE PREFERRED EMBODIMENTS OF THE PRESENT INVENTION

The process of the present invention has as its first step conversion of an alkyl aryl compound to a chlorinated alkyl aryl compound in which at least one carbon atom of the alkyl subtituent is dichlorinated or in which adjacent carbon atoms of said alkyl substituent are monochlorinated. The feed materails which may be used in such process are the alkyl aryl compounds having at least one alkyl substituent of at least two carbon atoms. Generally, the starting alkyl aryl compound corresponds in skeletal structure to the alkynyl aryl compound which it is desired to produce. The alkyl aryl feed compounds may contain as additional substituents to the aryl nucleus such radicals as methyl radicals and/or such monohydrocarbon radicals as halogen, amine, nitro, hydroxy, acetyl, and the like. The aryl radical usually is a carbocyclic radical such as phenyl or naphthyl but in some instances may be a heterocyclic radical. Exemplary of compounds useful as feeds to the process of the present invention are ethylbenzene, diethylbenzenes, ethyltoluenes, ethylchlorobenzenes, propylbenzene, dipropylbenzenes, ethylpropylbenzenes, propyltoluenes, ethylnitrobenzenes, ethyl naphthalenes, diethylnaphthalenes, triethyl benzenes, and the like. Preferably, the alkyl aryl compounds used as feeds are alkyl aryl hydrocarbons having alkyl substituents of two or three carbon atoms.

In the most useful embodiment of the present invention, the preferred feed to the present process is o-, m-, or p- diethylbenzene or a mixture thereof. These materials are converted by the process of the present invention to the corresponding diethynylbenzenes.

The chlorination of the alkyl aryl compound generally is carried out by introducing chlorine and the alkyl aryl compound into contact with one another and in the presence of a light source of wave length sufficient to reduce chlorine to atomic form. Generally, such light sources as sunlight, incandescent light or ultra violet light may be employed. The reaction is carried out with agitation. A convenient means of carrying out the reaction is to merely pass chlorine gas through an agitating alkyl aryl compound in the presence of sunlight or light from an ordinary electric light. While a catalyst generally is unnecessary, if desired the reaction may be promoted with a suitable catalyst such as for example phosphorous pentachloride, phosphorous trichloride, sulfuryl chloride, and the like.

Ambient temperatures may be employed for the chlorination step though due to the exothermic nature of the reaction, elevated temperatures usually will prevail throughout most of the reaction period. If desired, however, either subambient or elevated temperatures may be used for initiating or carrying out the reaction. Temperatures generally will be maintained below 150°C, preferably within the range of −25° to 100°C. Since the higher the temperature the faster the reaction, temperature may be used to regulate rate of reaction. Reaction time may in turn be used to regulate the degree of chlorination achieved. For example, at a given temperature by stopping the reaction at a point when the reaction mass has shown a weight gain equivalent to that required for the desired chlorinated product, a reaction product predominant in the desired chlorinated compound may be obtained. In this manner, such a compound as diethylbenzene may be chlorinated to produce primarily dichlorinated diethylbenzene or primarily tetrachlorinated diethylbenzene as desired. In the chlorination of diethylbenzene which subsequently is to be dehydrochlorinated in accordance with the present invention to produce diethynylbenzene, the temperature is usually maintained within the range of 0°C to 125°C and the reaction carried on for a period of ½ to 4 hours to thereby produce the tetrachlorinated diethylbenzene.

Upon chlorination to the desired degree, the intorduction of chlorine into the reaction mass is stopped. The reaction mixture is then neutralized, preferably immediately upon cessation of chlorine entry. Neutralization may be carried out by conventional means such as by contacting the reaction mass with a basic medium such as sodium or potassium carbonate, sodium or potassium hydroxide generally in aqueous solution, sodium amide, and the like. When sodium amide is to be employed in dehydrochlorination, the neutralized reaction mass is dried of residual water.

Depending upon the desired end product of the process of the present invention, it may or may not be ncessary to subject the chlorinated alkyl aryl compounds to a separation step before subjecting such compounds to dehydrochlorination. If separation is desired, any suitable convenient separation method may be employed. In the preferred practice of the present invention, that of converting diethylbenzene to diethynylbenzene, quite surprisingly it has been found unnecessary to separate or concentrate components of the tetrachlorinated diethylbenzene product since apparently, upon dehydrochlorination, a majority of the tetra isomers of the tetrachlorinated diethylbenzene are converted to the desired diethynylbenzene.

The dehydrochlorination step of the process of the present invention is carried out in the presence of a basic medium. Usually the chlorinated alkyl aryl compound is added to a strongly basic reaction medium with agitation. The strongly basic reaction medium employed may be any of the common strong bases such as the alkali or alkaline earth metal bases, i.e., sodium hydroxide, potassium hydroxide, sodium amide, sodium methoxide, potassium tert-butoxide, etc. Particularly useful is a sodium amide reaction medium preferably one which had been prepared in situ by adding metallic sodium to an excess of liquid ammonia in the presence of a suitable catalyst such as $Fe(NO_3)_3$ to produce the sodium amide suspended in liquid ammonia. In another particularly useful mode of carrying out the dehydrochlorination step of the process of the present invention, a conventional strong base such as sodium hydroxide or potassium hydroxide is initially employed followed by sodium amide. The use of such a combination of bases has been found to be practically as efficient as the use of sodium amide, the preferred base, alone and is much less expensive. An addtional useful embodiment of the process of the present invention contemplates the neutralization of the chlorinated product of the chlorination reaction with the same basic component used to catalyze the dehydrochlorination reaction, thereby saving time and expense in handling of materials.

The basic medium may be dispersed in any inert solvent medium. With the sodium amide and liquid ammonia, the liqid ammonia serves as a dispersing solvent. However, if desired, such solvents as mineral oil, benzene, toluene, cyclohexane, xylenes, etc. may be used as a dispersing solvent for sodium amide. The alkali and alkaline earth metal hydroxide bases may be used in aqueous or alcoholic solution though alcoholic solutions are somewhat preferred.

The amount of basic medium employed should be enough to provide sufficient alkali or alkaline earth metal ions for reaction with those chlorine radicals to be removed thereby from the chlorinated alkyl aryl compound. Usually, the amount of basic medium employed will be sufficient to provide a ratio of base metal ions to chlorine radicals on the chlorinated alkyl aryl compound within the range of 1 to 2. Preferably, the amount of base provided will be sufficient to provide slightly more than one ion of an alkali or alkaline earth metal for each chlorine radical on the chlorinated alkyl aryl compound to be dehydrochlorinated. Determination of the precise amounts of basic medium required to provide such ratios is well within the ability of those skilled in the art.

Temperatures employed in dehydrochlorination are dependent upon the particular basic medium employed. With the use of the stronger bases such as sodium amide, temperatures ranging from far below 0°C to elevated temperatures of 50°C and higher may be employed without significant difference in reactivity. Using the preferred strong bases, the temperature selected for carrying out the reaction is most often based upon the characteristics of the solvent employed. For example, if liquid ammonia is used as the solvent, temperatures well below 0°C are generally employed in order to facilitate liquification of the ammonia whereas if the solvent employed is normally liquid such as toluene, xylenes, etc., ambient temperatures most likely will be employed. When utilizing the less strong bases such as sodium hydroxide or potassium hydroxide, temperatures may vary from ambient to elevated temperatures, such temperatures ranging from 25° to 125°C and higher.

Pressures generally are autogenous in the dehydrochlorination reaction. Usually, it is only when solvents are employed which require pressure for liquification under the temperature conditions imposed thereon that elevated pressures are applied to the reaction zone.

The dehydrochlorination reaction, under normal conditions as defined herein, most often is complete within ½ to 8 hours, preferably ½ to 4 hours. However, depending upon the efficiency of contact between the basic catalyst and the chlorinated alkyl aryl compound the contacting time may vary outside of these ranges. Therefore, some means of insuring intimate contact between the chlorinated alkyl aryl compound and the basic catalyst generally is provided. In most instances, simple stirring will be adequate.

Upon completion of the dehydrochlorination reaction, the alkynyl aryl compound is recovered from the reaction mixture. While any convenient means may be employed in such recovery, the following procedure has been found quite useful: the reaction mixture is treated with water and the solvent evaporated from the reaction zone. When employing the preferred sodium amide and ammonia basic catalyst system, the reaction mixture is first treated with water, the excess ammonia evaporated therefrom and the remaining organic material taken up in a suitable solvent and the organic material-solvent mixture then thoroughly water washed. The solvent is then flashed or otherwise separated from the product. Among the solvents useful in this step are such solvents as benzene, carbon tetrachloride, petroleum ether, toluene, xylenes, etc. Employing the other basic media, substantially the same procedure is followed.

After completion of the final water washing of the dehydrochlorination reaction product, the alkynyl aryl compound may be recovered from the organic phase thereof by any conveient method such as by flashing, etc. In some instances, depending on purity of the initial feed material to the process of the present invention and the requirements of the final product, additional purification of the organic mixture recovered from water washing may not be required, however, in most instances it is desirable to further purify the washed product by such conventional means as distillation, liquid-liquid extraction, etc.

The alkali and alkaline earth metal chlorides resulting from the reaction of such metals with the chlorides removed during dehydrochlorination may be reconverted to chlorine and alkali and alkaline earth metal. The chlorine may then be recycled to the first step of the process of the present invention and the metal may be reformed into a basic compound suitable for the neutralizing agent used just prior to dehalogenation and/or the basic catalyst used in dehydrochlorination.

The process of the present invention may be carried out in a single reaction vessel or in two or more reaction vessels as desired. For example, chlorination may be carried out in one reaction vessel with a second vessel being used for intermediate treatment of the product thereof and a third vessel then used for dehydrochlorination and still a fourth vessel used for treatment and recovery of the product of the dehydrochlorination. On the other extreme, the entire process from chlorination through recovery of the product of the dehydrochlorination may be carried out in a single vessel. Choice of which arrangement to use will depend on the desires and economics of the individual user of the process of the present invention.

In order to further describe and to specifically demonstrate the process of the present invention, the following examples are presented. These examples are not to be construed as limiting the present process.

EXAMPLE 1

In this example, diethynylbenzene was prepared from diethylbenzene. The procedure followed was as follows: To a 250 ml. round bottom flask fitted with a gas inlet tube, reflux condenser and a magnetic stirrer were added 75 g. (0.56 mole) meta-diethylbenzene and 1.0 g. $PCl_5$. A 300 Watt incandescent bulb was placed next to the flask and illuminated. Chlorine was passed into the reaction mixture through the gas inlet tube. The reaction mixture was stirred throughout addition of chlorine. The addition of the chlorine continued until 183 g. which represented a 15 percent excess above four moles chlorine per mole of diethylbenzene, was introduced into the flask. The time required for introduction of the chlorine was 4½ hours with the rate of addition being sufficient to maintain the reaction temperature at 95° to 110°C. Upon cessation of the addition of chlorine, the reaction mixture was found to weigh 159 g., a weight increase of 83 g. over the weight of starting material. This corresponded to approximately 1.17 moles of chlorine which in turn corresponds to 4.18 atoms of chlorine per mole of diethylbenzene employed. The reaction mixture was washed immediately with dilute aqueous $NaHCO_3$ and thereafter washed with water and dried over anhydrous $MgSO_4$.

To another 250 ml. round bottom flask fitted with a dry ice condenser with drying tube, dropping funnel and magnetic stirrer was added 200 ml. of liquid ammonia with 0.1 gram $Fe(NO_3)_3$ and 0.5 grams metallic sodium. The reaction mixture was stirred continuously during the addition of these components and for about 5 minutes thereafter. Air was then bubbled through the reaction mixture for one-half minute to assure oxidation of any unreacted metallic sodium. Thereafter, 6.9 grams (0.3 mole) metallic sodium were added intermittenly. The resulting mixture consisted of a gray suspension of sodium amide and ammonia. To this mixture of sodium amide was added 10 g. (0.037 mole) of chlorinated product prepared as defined in the previous paragraph, this amount representing a molar ratio of 8:1, sodium amide to chlorinated product. This product was added dropwise over a 15 minute period and the resulting mixture stirred for about 8 hours. The reaction mixture was then treated with approximately 50 ml. of water and thereafter the ammonia was evaporated from the system. The organic product was then extracted by means of 50 ml. of benzene. Upon standing, two phases formed, one of the phases consisting of a benzene solution of the desired product. The two phases were separated and the organic phase subjected to analysis which showed meta-diethynylbenzene to have been obtained in an amount equivalent to 57 percent of the theoretical yield.

EXAMPLE 2

Example 1 is substantially repreated with the exception that para- diethylbenzene is employed as the starting alkyl aryl compound. Following the procedure of Example 1, a good yield of para- diethynylbenzene is obtained.

EXAMPLE 3

Example 1 is again substantially repreated except with respect to the dehydrochlorination of tetrachlorodiethylbenzene. Instead of employing sodium amide as the only basic medium, the tetrachlorinated diethyl-benzene is treted under reflux conditions for about 30 minutes with a methanol solution of potassium hydroxide in 2:1 molar ratio to the tetrachlorinated diethylbenzene followed by a flash distillation of the mixture to remove methanol as one overhead stream and partially dehydrochlorinated product as another overhead stream. The partially dehydrochlorinated product is then treated in 2:1 molar ratio with sodium amide prepared by the procedure of Example 1, the sodium amide treatment being carried out under the conditions of Example 1. From this run, a good yield of meta-diethynylbenzene is obtained but with a 50 percent reduction in the amount of sodium amide employed by virtue of replacement of one-half of the amount used in Example 1 with less expensive potassium hydroxide.

In another run, sodium hydroxide is used instead of potassium hydroxide but in the same manner.

EXAMPLE 4

Example 1 is substantially repreated with the exception that propylbenzene is employed as the alkyl aryl compound. Following the procedure of Example 1, a good yield of 1-methyl-2-phenylacetylene is obtained.

We claim:

1. A process for the conversion of alkyl aryl hydrocarbon having alkyl substituents of two or three carbon atoms which comprises subjecting said alkyl aryl hydrocarbons to chlorination, in the presence of a light source of wave length sufficient to reduce chlorine to atomic form, and in the presence of a catalyst selected from the group consisting of $PCl_5$, $PCl_3$ and sulfuryl chloride, at a temperature within the range of 0°C to 125°C for a period of less than 4½ hours, to thereby bring about the dichlorination of at least one carbon atom of an alkyl substituent to said alkyl aryl hydrocarbon or monochlorination of adjacent carbon atoms of said alkyl substituent, subjecting the rection mixture to neutralization, and then subjecting the resulting chlorinated alkyl aryl hydrocarbon to dehydrochlorination in the presence of a basic medium which is an alkali metal base selected from the group consisting of potassium hydroxide, sodium hydroxide, sodium amide, sodium methoxide, potassium tertbutoxide and mixtures thereof, and thereafter recovering alkynyl aryl hydrocarbons.

2. The process of claim 1 wherein the alkyl aryl compounds are diethylbenzenes.

3. The process of claim 2 wherein said diethylbenzenes are tetrachlorinated in the chlorination reaction.

4. The process of claim 1 wherein said basic medium is sodium amide suspended in liquid ammonia.

5. The process of claim 4 wherein said sodium amide is prepared in situ from metallic sodium and liquid ammonia.

6. The process of claim 1 wherein an alkali metal hydroxide and sodium amide are used jointly as the basic catalyst in dehydrochlorination.

7. The process of claim 1 wherein said alkyl aryl hydrocarbon is ethylbenzene and wherein said alkynyl aryl hydrocarbon is phenylacetylene.

* * * * *